Feb. 28, 1933.  C. A. GRATIOT  1,899,439
LAWN MOWER
Filed Dec. 23, 1931   2 Sheets-Sheet 1
Fig. 1.
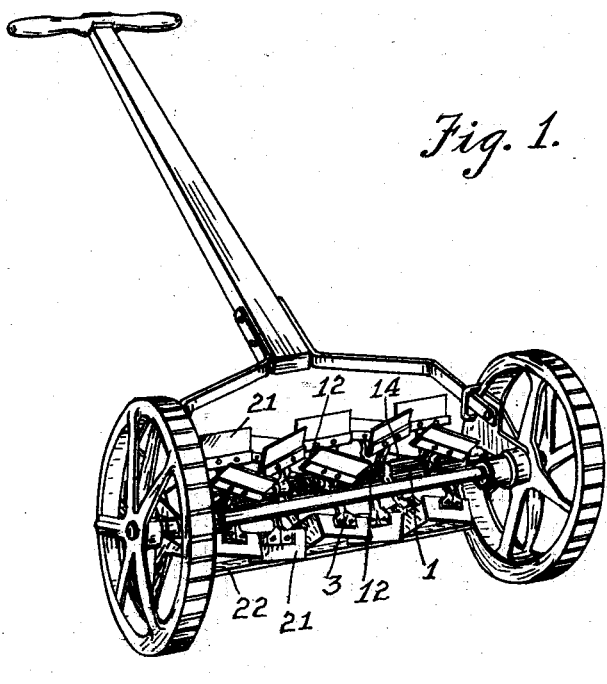
Fig. 7.
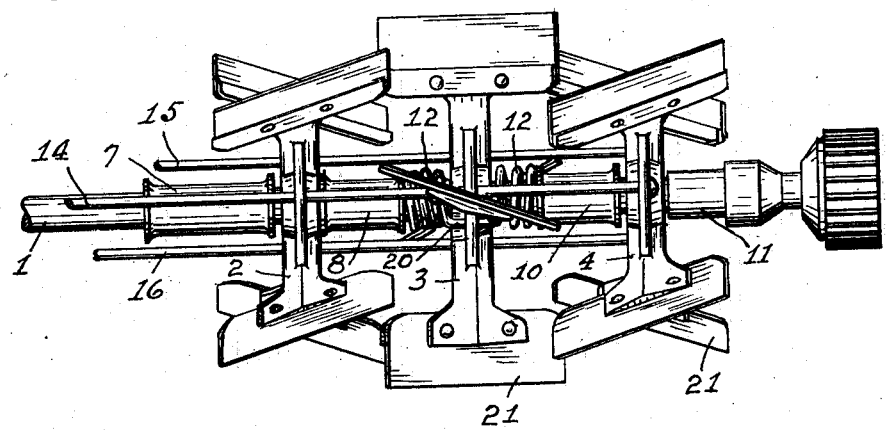
Fig. 2.
Inventor,
CHESTER A. GRATIOT,
By Horace Barnes
Attorney.

Feb. 28, 1933.  C. A. GRATIOT  1,899,439
LAWN MOWER
Filed Dec. 23, 1931   2 Sheets-Sheet 2

Inventor,
CHESTER A. GRATIOT,
By Horace Barnes
Attorney.

Patented Feb. 28, 1933

1,899,439

UNITED STATES PATENT OFFICE

CHESTER A. GRATIOT, OF PORTLAND, OREGON, ASSIGNOR TO EVERSHARP LAWNMOWER COMPANY, A CORPORATION OF OREGON

LAWN-MOWER

Application filed December 23, 1931. Serial No. 582,753.

This invention relates to improvements in lawn mowers.

The principal object of my invention is to provide a lawn mower having a plurality of individual knife carriers mounted upon a driven shaft and which support a plurality of individual knives.

A further object of the invention is to provide a rotatable shaft having a plurality of knife carriers or spiders mounted thereon, each arm of which is provided with a flexible cutting knife whose cutting edges are disposed to make operative alignment with respect to a stationary knife.

A still further object of the invention is the provision of a number of knife carriers yieldably mounted upon the driven shaft whereby shocks encountered by the knife-blades are absorbed without damage to the parts or proper alignment thereof.

Other objects and advantages residing in my invention, and objects relating to details of construction thereof, will be readily apparent in the course of the detailed description to follow.

The accompanying drawings illustrate by way of example a preferred form of my invention, in which:

Figure 1 is a view in perspective of a lawn mower in which my invention has been embodied.

Fig. 2 is a fragmentary view in side elevation of the cutter head and immediately connected driving mechanism.

Fig. 7 is a plan view of a typical blade.

Figure 3:
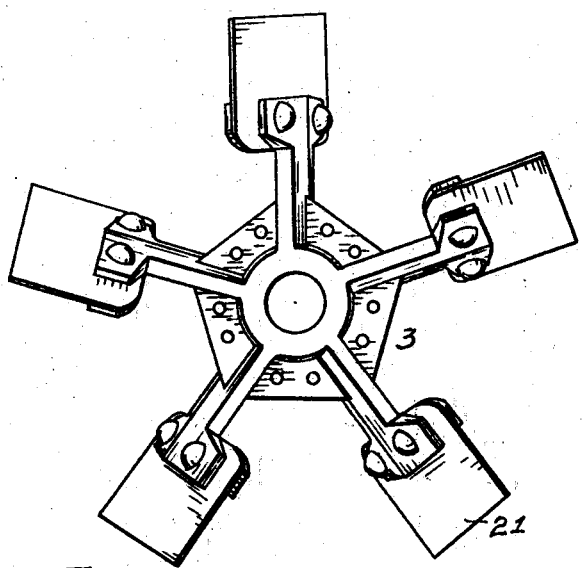
Fig. 3 is a detached view in end elevation of a typical unit of which the cutter-head is composed.
Figure 5:
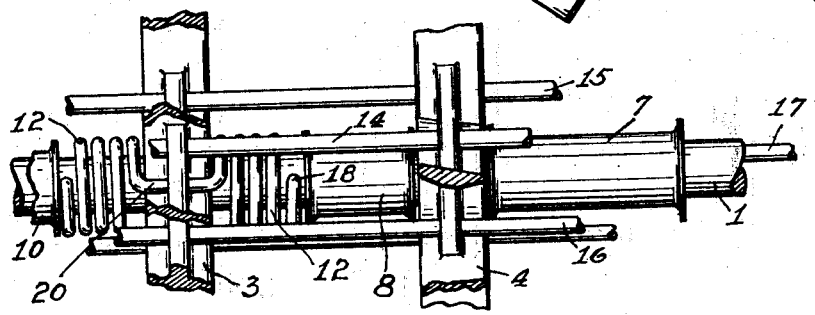
Fig. 5 is a detail fragmentary view of the flexible connections of the cutter-head.

Referring to said views, the reference numeral 1 indicates a shaft upon which are mounted the knife-carriers 2, 3 and 4, which are fitted to the shaft 1 so that they may rotate freely thereon. These carriers are further retained in axial relationship by sleeves 7, 8 and 10 interposed therebetween, the entire assembly being constrained by the bearing-cones, such as 11, disposed at the ends of the shaft and fixed thereto. The knife carriers are actuated with the shaft to partake of its rotary motion by flexible devices comprising the coil-springs 12 and the flexible metal rods 14, 15, 16 and 17 extending parallel with the shaft.

The knife carriers each consist of a hub 23 through which the shaft 1 extends, having a plurality of integral arms 24 extending radially therefrom upon whose extremities cutting-blades 21 are secured. Between the arms 24, integral webs 25 are provided having perforations 26 through which said rods extend.

Figure 6:
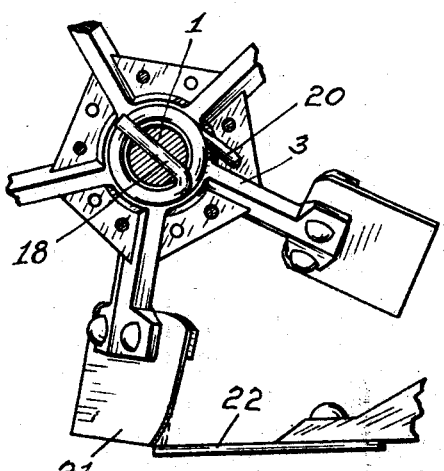
Fig. 6 is a fragmentary view taken on line 6—6 of Fig. 5.
Figure 4:
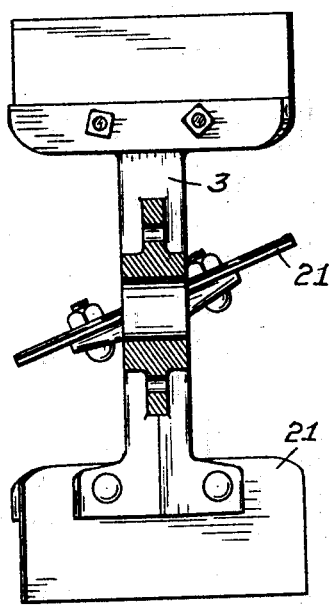
Fig. 4 is a sectional view taken on line 4—4 of Fig. 3.

The coil-springs 12 are formed and disposed as to be accommodated upon the shaft 1 and affixed thereto at both ends, as at 18, see Fig. 6, while a middle portion 20 thereof, see Figs. 2 and 6, engages or passes through a perforation in the knife-carrier. Thus the carrier is flexibly attached to the shaft with reference to rotary motion. Rotary motion is further communicated to the carriers by means of the flexible rods which transfix the several carriers.

Further flexibility and elasticity of the operating parts is provided by the flexible blades of which the one illustrated in Fig. 7 is typical. In Fig. 6 a blade 21 is shown flexed by contact with the stationary knife 22 between which and the blade 21 the grass is sheared.

The peculiar effectiveness resulting from the flexure and extension of said blades when passing over the stationary knife 22 contribute to the efficacy of the mower in this wise:

Firstly, the effective adjustment of the stationary blade with reference to the revolving cutter edges is rendered less delicate or critical and a greater amplitude of adjustment of the stationary blade with relation to the cutter knives affects the value of the friction less than in mowers having rigid knives.

Secondly, the flexure of the blades upon contact with an object to be sheared insures the contact therewith of a sharp or foremost edge of the blade, while subsequently to the shearing of said object the extension of the blade and consequent increase of the angle subtended between the foremost face of the blade and upper side of the stationary knife, coupled with a micrometrical expansion of the radial dimension of the blade, causes the wearing away of the hindermost portion of the edge of the blade by the scraping contact of the cutters with the stationary blade after the cut is made. In this manner a constant whetting of the blades is accomplished.

The destructive effect upon the alignment of the operative parts caused by the accidental contact with the rapidly revolving knives with hard objects, such as stones, is minimized to a high degree. By the particular construction wherein only extremely light portions of the mechanism having minimum momenta for a given velocity are disposed in vulnerable positions, the total energy necessarily absorbed and dissipated by the parts involved upon such accident is relatively small.

The further division of the total weight of the revolving cutter head into several axial sections, flexibly interconnected with reference to rotative movement, provide for a minimum ultimate value of the disruptive forces by extending the time in which the whole revolving mass must be retarded without ill effect.

Having described my invention, what I claim, is:—

1. In a lawn mower, a cutter head composed of a driven shaft, a plurality of knife carriers having flexible knife blades attached thereto mounted upon said shaft, and resilient driving connections between said shaft and said knife-carriers.

2. In a lawn mower, a cutter head comprising a driving shaft, a central knife carrier loosely mounted on said shaft and elastically driven thereby, and a plurality of additional similar carriers elastically driven from said central carrier.

3. In a lawn mower cutter-head, a rotatably driven shaft, a plurality of knife carriers loosely mounted thereon, said knife-carriers being resiliently connected by a plurality of flexible rods, and spring-connections between said knife-carriers and said shaft.

4. In a lawn mower, a cutter head comprising a rotatably driven shaft, a plurality of knife-carriers loosely mounted on said shaft, each said carrier including a plurality of radially directed arms having cutting-blades secured thereto, rods flexibly connecting said carriers, and spring-connections between said carriers and said shaft.

CHESTER A. GRATIOT.